United States Patent Office 3,382,022
Patented May 7, 1968

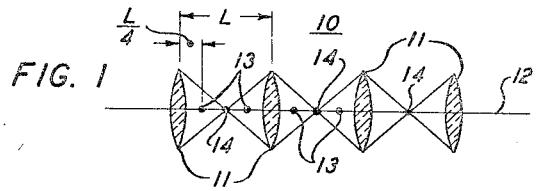
FIG. 1
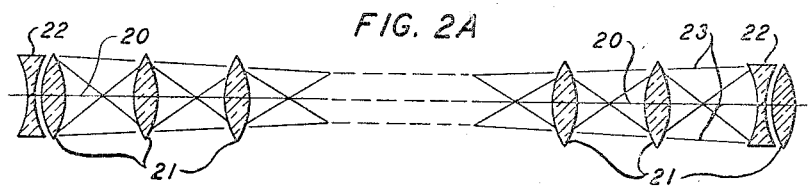
FIG. 2A
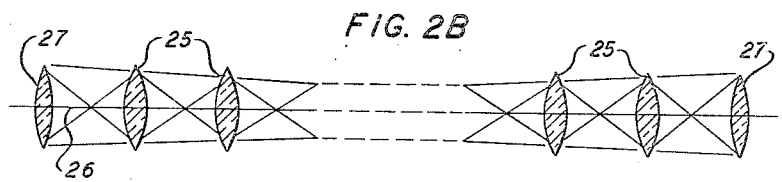
FIG. 2B
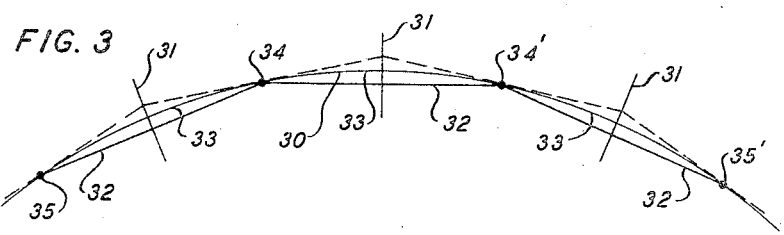
FIG. 3
FIG. 4
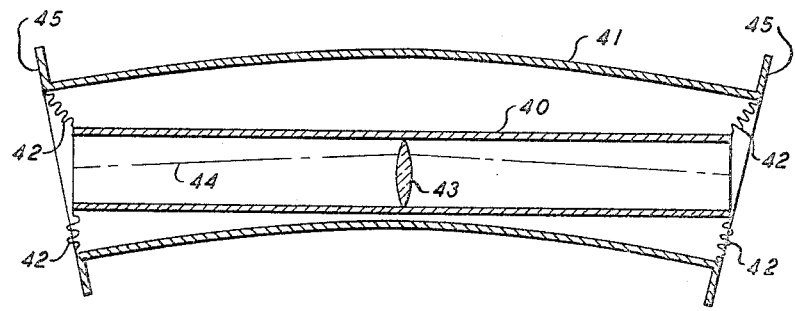
INVENTOR
A. G. FOX
BY
ATTORNEY /ol

3,382,022
LENS GUIDED OPTICAL TRANSMISSION PATH WITH DIFFRACTION CORRECTION
Arthur G. Fox, Rumson, N.J., assignor to Bell Telephone Laboratories, Incorporated, New York, N.Y., a corporation of New York
Filed Oct. 12, 1964, Ser. No. 403,201
5 Claims. (Cl. 350—54)

ABSTRACT OF THE DISCLOSURE

A transmission path for optical frequency wave energy comprising a series of convergent lens members spaced apart a distance equal to four times their focal length. Transmission losses are reduced by introducing divergent lens members at specified periodic locations.

---

This invention relates to long distance transmission of electromagnetic wave energy in the optical frequency range. More specifically, it relates to an optical transmission path comprising a plurality of spaced lenses The advent of the optical maser with its widespread utility in the communications field has stimulated interest in transmission media capable of carrying signal bearing optical frequency energy from place to place with low attendant loss. As used in this specification the term optical frequency energy is intended to include frequencies from infrared, through visible, and into the ultraviolet. Various optical frequency transmission media comprising lens or mirror arrangements are described, for example, in United States Patent 2,651,715 issued Sept. 8, 1953, to M. E. Hines; in United States Patent 3,101,472 issued Aug. 20, 1963, to G. J. E. Goubau; and in an article by S. E. Miller entitled, "Directional Control in Light Wave Guidance," which appeared in the July 1964 issue (Part 2) of the Bell System Technical Journal.

One advantageous use of such media is as curvilinear optical transmission paths in which the light beam is bent to follow available rights of way or in which the direction of the beam is changed for the operations necessary at a repeater station. A particularly useful transmission medium for beam bending is one in which successive lenses are separated a distance equal to four times their focal length. Such a focusing arrangement is known as a "concentric" lens system.

A recurring problem in lens guided optical systems is the transmission loss introduced by the guiding components themselves. Dielectric losses, reflection losses, and spurious mode losses are, of course, present. Diffraction losses introduced by beam bending are particularly troublesome.

The object of the present invention is to reduce transmission losses caused by diffraction when beam bending occurs.

In a system of sequential lens members for guiding coherent energy, there is, at the central plane normal to the axis of propagation within each member, a group of rays each of which is parallel to the axis. These rays are the stable rays of the system. All other rays at this central point are unstable and are deflected through an angle for which they are ultimately lost from the propagation volume. The stable rays, observed on the propagation axis at a point midway between successive lenses, define a cone with its apex at the point of observation. Ray diffraction at each lens reduces the number of rays in the stable cone.

It is therefore a more specific object of the present invention to increase the number of stable rays associated with the lenses in a lens guided transmission system.

The objects of the present invention are realized in a focusing system comprising an iteration of lens arrays each consisting of a series of concentrically spaced convergent lens members and a diffraction correcting means.

In accordance with a first specific embodiment of the invention, the diffraction correcting means comprising a closely spaced pair of lenses in which one lens is identical to the lenses in the concentric series and the other lens is a divergent lens having a focal length equal to one-half the length of the lens array.

In accordance with a second embodiment of the invention, the diffraction correcting means comprises a single convergent lens member having a focal length equal to the effective focal length of the lens pair in the first embodiment.

A feature of the invention is the use as the transmission path of sections of hollow tubing with a convergent lens at the center of each section. The tubing can be suspended from an outer tube by pliant supports which allow the transmission members to define a devious path, while the light beam within the inner tube remains rectilinear and properly aligned.

The above and other objects and features of the invention, together with its various advantages, will be more readily understood by reference to the accompanying drawing and to the detailed description thereof which follows.

In the drawing:

FIG. 1 is a schematic representation of a concentric lens system;

FIG. 2A is a schematic representation of a first focusing system in accordance with the present invention;

FIG. 2B is a schematic representation of a second focusing system in accordance with the invention;

FIG. 3 is a representation of a curved beam path in which the present invention is useful; and FIG. 4 is one section of a guiding structure applicable in the arrangement of FIG. 3.

Referring now in detail to FIG. 1, there is shown a focusing system 10 comprising a plurality of convergent focusing devices 11 spaced apart a distance L along transmission axis 12. Focusing devices 11 are illustrated as dielectric lenses in FIG. 1, but other convergent lens structures can be used. The system is concentric; that is, the focal lengths of the lenses are each equal to one-fourth their separation from the next succeeding lens, or L/4. Focal points 13 illustrate the spatial relationship among the lenses. In system 10, only those light rays which radiate from points 14 on axis 12 midway between each pair of lenses are stable and can propagate without being quickly lost from the system. If these stable rays are traced into one of the lenses 11, it will be found that, at the central plane of the lens, the rays propagate parallel to axis 12. All other rays are unstable and are ultimately deflected out of the transmission path. The concentric lens focusing system, however, is characterized by undesirably high diffraction losses.

In accordance with the invention, low loss light transmission can be realized in the embodiment illustrated in FIG. 2A, in which a portion of an iteration of lens arrays, each consisting of a series of lens members disposed along an axis of propagation 20, is depicted. In FIG. 2A, members 21 are convergent dielectric lenses spaced apart a distance L and characterized by a concentric relationship in which the focal length of each lens is L/4, the focal points of lenses 21 not being illustrated. In accordance with the invention, a series of divergent lenses 22 are disposed on axis 20 adjacent particular nonsuccessive ones of lenses 21. The focal points of divergent lenses 22 are substantially coincident midway therebetween. Thus the divergent lenses 22 are confocal. In practice, the divergent lenses would be considerably weaker than illustrated and successive divergent lenses would be spaced apart, with the confocal condition substantially intact, to include between them an appreciable number of convergent lenses. A typical number of convergent lenses in a single lens array is of the order of twenty. The omission of many lenses is indicated by the dashed central portion of FIG. 2A.

In a confocal lens arrangement, the overall transverse beam dimension $w$ between confocal lenses 22 which are spaced apart a distance $b$ varies from a maximum at the lens surfaces to a minimum halfway between, within an envelope 23 well known to vary from a maximum beam radius at the lenses equal to $$w_m = \sqrt{\frac{b\lambda}{\pi}}$$

where $\gamma$ is the wavelength of the energy within the beam. Simultaneously, as illustrated in FIG. 2A, the beam is focused by the convergent lenses 21 to cross axis 20 once between each convergent lens pair, with the transverse beam extent always limited by envelope 23.

As a specific example, consider that first and second confocal divergent lenses are placed adjacent the first and twenty-first of a series of convergent lens members spaced at twenty foot intervals. Thus, to be confocal the lenses 22 must have focal lengths of (−200) feet. At 6328 A., therefore, $w=.496$ cm., and the beam diameter at the divergent lens members is approximately one centimeter. Midway between the confocal lenses the beam diameter falls to a minimum of approximately .7 centimeter. If a smaller maximum beam diameter is required, the confocal divergent lenses are spaced more closely; if a larger diameter is desired, the divergent lens spacing is increased.

The convergent-divergent lens pair discussed with reference to FIG. 2A can be replaced by a single convergent lens chosen to have the same effective focal length as the lens pair. Such an all-convergent lens system is illustrated in FIG. 2B in which a series of concentric lens members 25 are spaced apart along axis 26 between diffraction correcting means 27 which comprise convergent lens members having a focal length $f_e$ defined by $$f_e = \frac{f_1(-f_2)}{f_1 + (-f_2)}$$

where $f_1$ and $(-f_2)$ are the focal lengths of concentric lenses 21 and the divergent lens 22 in FIG. 2A, respectively. In accordance with the invention, $f_1$ is equal to $L/4$ and $f_2$ is equal to $nL/2$ where L is the lens separation. Substitution of these quantities in the equation for $f_e$ above produces an over-all focal length for the diffraction correcting means of $$\frac{nL}{2(2n-1)}$$

One means for conducting a light beam around a curved path 30 is to use a focusing system of lens arrays designed in accordance with the principles set out hereinabove with respect to FIGS. 2A or 2B and indicated diagrammatically in FIG. 3. In FIG. 3, curved path 30 is the approximate path to be traversed by a light beam beginning at point 35 and ending at point 35. Since light travels in a straight line, path 30 is broken into a plurality of equal length arcs 33 having chords 32. A lens array comprising a series of concentric lens members and one associated diffraction correcting means are then disposed along the transmission path, with a lens member positioned symmetrically at the center of and normal to each of chords 32. In such an arrangement, a central light ray, indicated by the dashed line in FIG. 3, which is tangent to an arc 33 at point 34 located at the juncture of successive chords, will strike the succeeding lens 31 and will be refracted thereby an amount sufficient to return the ray to tangency at the next succeeding point 34'. Thus, a light pipe can be made up of sections of hollow tubing which have a length equal to the distance between the tangent points 34 of the central ray and which contain the lenses at their center.

A section of one embodiment of such a light pipe is shown in FIG. 4 in which inner rigid tubular member 40 is resiliently supported by bellows type means 42 within outer tube 41. Outer tube 41 bends smoothly under stresses applied to follow the desired curvilinear path. Convergent lens 34, positioned within and at the center of member 40, is selected in accordance with the principles of the present invention set out hereinbefore. A light beam, represented by central ray 44, which enters tangent to the central arc of tube 41, will always emerge from the center of the cross section of the end flange 45' again tangent to the central arc of outer tube 41. By interconnecting a series of such tube sections, a devious path can be pursued while the light beam propagates rectilinearly within the inner pipe.

As a specific example, if the tube sections are 20 feet long, with an outer tube I.D. of 4.4 inches and an inner tube O.D. of 2 inches, the section could accommodate 2.3 degree bends, which correspond to a transmission path with a 500 foot radius of curvature.

In all cases the above-described arrangements are only illustrative of the principles of the invention. Numerous and varied other arrangements can be devised in accordance with these principles by those skilled in the art without departing from the spirit and scope of the invention.

What is claimed is:

1. A transmission path for optical frequency wave energy comprising a plurality of convergent dielectric lenses spaced apart a distance L along the path of said energy guided thereby, each of said lenses having a focal length equal to $L/4$, and a plurality of confocally spaced divergent lenses disposed on said path adjacent selected non-successive ones of said convergent lenses.

2. A transmission path for optical frequency wave energy comprising a plurality of straight sections of hollow pipe interconnected at a finite angle, means for focusing energy traveling within said sections, said means comprising convergent lens members positioned within and at the center of each pipe section, said convergent lens members having focal lengths equal to one-fourth their separation from the next succeeding lens member, and confocal divergent lens members positioned adjacent selected ones of said convergent lens members, said divergent lens members being spaced apart to include a plurality of convergent lens members therebetween.

3. A focusing system for light rays comprising an iteration of substantially identical lens arrays each consisting of a series of $n$ identical convergent lens members spaced apart a distance L which is four times the focal length of each of said members, and one diffraction correcting means optically aligned with said lens members and comprising a focusing member having a focal length substantially equal to $nL/2(2n-1)$.

4. The focusing system according to claim 3 in which said diffraction correcting means comprises a convergent lens identical to said identical convergent lens members contiguous to a divergent lens of focal length $-nL/2$.

5. The focusing system according to claim 3 in which said diffraction correcting means comprises a single convergent lens.

References Cited

UNITED STATES PATENTS

| | | | |
|---|---|---|---|
| 2,519,760 | 8/1950 | Hett | 350—54 |
| 3,133,143 | 5/1964 | Strang et al. | 350—54 |

DAVID H. RUBIN, *Primary Examiner.*

JEWELL H. PEDERSEN, *Examiner.*

R. J. STERN, *Assistant Examiner.*